(12) United States Patent
Peacock

(10) Patent No.: US 9,154,630 B2
(45) Date of Patent: *Oct. 6, 2015

(54) SYSTEM AND METHOD FOR COMMUNICATIONS IN A MULTI-PLATFORM ENVIRONMENT

(71) Applicant: Gregory Peacock, Oxnard, CA (US)

(72) Inventor: Gregory Peacock, Oxnard, CA (US)

(*) Notice: Subject to any disclaimer, the term of this patent is extended or adjusted under 35 U.S.C. 154(b) by 255 days.

This patent is subject to a terminal disclaimer.

(21) Appl. No.: 13/893,256

(22) Filed: May 13, 2013

(65) Prior Publication Data

US 2013/0250816 A1    Sep. 26, 2013

Related U.S. Application Data

(63) Continuation of application No. 11/179,699, filed on Jul. 11, 2005, now Pat. No. 8,442,506.

(60) Provisional application No. 60/590,694, filed on Jul. 23, 2004.

(51) Int. Cl.
| | |
|---|---|
| *H04M 3/42* | (2006.01) |
| *H04W 4/00* | (2009.01) |
| *H04B 7/00* | (2006.01) |
| *H04L 12/16* | (2006.01) |
| *H04M 3/56* | (2006.01) |
| *H04W 92/02* | (2009.01) |

(52) U.S. Cl.
CPC ............... *H04M 3/56* (2013.01); *H04W 92/02* (2013.01)

(58) Field of Classification Search
CPC ..... H04M 2250/62; H04M 3/56; H04W 4/10; H04W 76/005
USPC ........ 455/414, 416, 426.1, 518, 552.1, 553.1, 455/554.1, 555, 560, 561, 517, 521; 370/260, 262, 263
See application file for complete search history.

(56) References Cited

U.S. PATENT DOCUMENTS

| | | |
|---|---|---|
| 6,539,237 B1 | 3/2003 | Sayers et al. |
| 6,741,610 B1 | 5/2004 | Volftsun et al. |
| 6,788,946 B2 | 9/2004 | Winchell et al. |

*Primary Examiner* — Nay Maung
(74) *Attorney, Agent, or Firm* — SoCal IP Law Group LLP; Mark A. Goldstein

(57) ABSTRACT

A radio networking system includes at least a first communication port operable to facilitate communication between the radio networking system and a first communication platform. The system further includes at least a second communication port operable to facilitate communication between the radio networking system and a second communication platform. Additionally, a call control software module is operable to automatically and intelligently switch an incoming call from the first communication platform to the second communication platform which is controlled by a processor operable to execute the call control software module according to the information contained in a system configuration database. The call control software module further manages the configuration of call connections and conferencing services and supports real time user control of desired communication services.

19 Claims, 5 Drawing Sheets

SYSTEM AND METHOD FOR COMMUNICATIONS IN A MULTI-PLATFORM ENVIRONMENT

RELATED APPLICATION INFORMATION

This patent is a continuation of and claims priority from the U.S. patent application Ser. No. 11/179,699, now U.S. Pat. No. 8,442,506 entitled "System and Method for Communications in a Multi-Platform Environment" filed Jul. 11, 2005 and issued on May 14, 2013, which claims priority to U.S. Provisional Application No. 60/590,694 entitled "System and Method for Communications in a Multi-Platform Environment" filed Jul. 23, 2004.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

TECHNICAL FIELD OF THE INVENTION

The present invention relates, generally, to the field of telecommunications and more specifically, the present invention relates to a system and method 20 directed to a localized radio networking system for coordinating communication between different systems that are operating on different platforms.

BACKGROUND

The demands for interoperability between differing radio communications equipment employed by the various federal, state and local government agencies responsible for "first response" emergency communications have accelerated rapidly following in recent years. In many instances, existing deployed emergency two-way radio equipment will not interoperate. For example, radio equipment used by a county fire department may not work with the radio equipment used by its police department or with equipment used by federal agencies. In another example, emergency call centers may use communication switching capabilities in a PBX platform, but are incapable of initiating a communications session with emergency response teams that are only reachable via two-way radio communication platforms.

FIG. 1 shows various conventional communication systems and platforms that are independent of each other such that communication sessions cannot be initiated across the various platforms. The conventional communications system of FIG. 1 includes a conventional switched telephone network 110, a conventional VoIP system 120, and a conventional two-way radio system 130. Although, the communications systems depicted in FIG. 1 are simplified for ease of discussion, the limitations of these conventional communications systems are easily illustrated as problems of each are discussed briefly below.

In a typical switched telephone network 110, a public switched telephone network 115 (PSTN) provides a platform for a large number of telephones and cellular phones to communicate with each other. As shown on FIG. 1, a standard telephone 111 may communicate with other standard telephones (not shown) or a cellular phone 113 through a cell phone tower 112 that is part of a cellular wireless system. Typically, a cellular wireless system works in conjunction with the PSTN 115 to provide multiple capabilities for communication sessions via any standard telephone system, such as, for example, the well-known public system in the United States that utilizes 10-digit phone numbers for identification, routing and calling. Alternatively, a private branch exchange (PBX) 116 supporting many telephones 117, such as those used internally for a company, i.e., may be used such that only 4-digit extensions need be dialed within the PBX 116. Conventional switched telephone networks provide a number of capabilities for call switching, call routing, and call handling that are well known in the art and are not discussed in further detail herein.

In a typical VoIP system 120, a first VoIP server 121 and a second VoIP server 122 may communicate via a network 125, such as the Internet, for example, using a communication protocol, such as TCP/IP, for example. Each VoIP server 121 and 122 may, in turn, communicate with respective VoIP-capable telephones 123 and 124. As such, a communication session may be constructed to allow the first VoIP telephone 123 to communicate with the second VoIP telephone entirely over the network 125 without ever utilizing a PSTN, such as the PSTN system 110. Most typically, however, the VoIP servers 121 and 122 are part of a larger communication system (not shown in detail) that includes the capability of interfacing the VoIP system 120 with the PSTN system 110 via a VoIP Gateway 127. Such larger systems, require the use of separate VoIP Gateway 127 and Softswitch systems, the nature of which is well known and, again, is not discussed further herein.

The third system shown in FIG. 1 is a conventional two-way radio system 130. The two-way radio system 130 includes a radio base station 135 that provides radio-wave transmitting and receiving functions for any number of radios within radio-wave range of the radio base station 135, such as handheld radios 131 and 132 and any communication terminals connected directly to the radio base station 135, such as operator console 133. As such, the two-way radio system 130 provides a platform for communicating between radios and operator consoles using transmitted and received radio signals 134. For example, when a communication session is initiated at handheld radio 131 (i.e., a transmit button is depressed on a conventional push-to-talk radio), the radio base station 135 recognizes the initiation and receives signals from the initiating handheld radio 131. Again, two-way radio systems 130 are well known in the art and will not be discussed further herein.

The above-described communication systems have been used by any number of government agencies, polices forces, commercial firms, etc. for internal and external communications. Typically, the specific needs of each entity drive the choice and configuration of communications systems. For example, a police force needs a two-way radio system 130 to facilitate communication between officers on the street. Additionally, the police department typically uses a PSTN at police stations and other executive and clerical facilities. Thus, the police department uses two distinct communication systems for two distinct purposes, both of which are well suited for the type of communications typically required, but not well-suited for direct communication between the two platforms of the two communication systems.

Further, a nearby fire department also typically requires the same capabilities for communication. While the PSTN may be the same system as the police force, it is generally the case that each department has incompatible two-way radio equipment such that the two departments cannot communicate with each other's two-way radio system.

With the advent of coordinated emergency response plans implemented by government agencies and other private security agencies, the need for cross-system communication in an actual emergency becomes a critical requirement. For example, when a fire department responds to a fire in a tall building, the fire department may need to instruct the police department to re-route traffic away from the dangerous vicinity. Direct communication between officers of the police department and fire fighters of the fire department can be crucial in effectively coordinating an emergency response.

Furthermore, the first responder environment requires coordinated on-demand services. For example, the federal government my wish to participate in an emergency response if terrorism is determined to be a factor. Services necessary for cross-departmental communication, such as conferencing between proprietary systems, are typically not available to emergency response radio users. Even when such services are available, they are not automated and require live operator support which again requires additional equipment, dedicated operator support, and the foresight of predicting emergencies. Obviously, without automation, the requirement for on-demand services cannot be met.

Similar problems exist in tactical military environments, where communication equipment employed by the different branches of US armed forces do not interoperate. Furthermore, the mobility and capabilities of current communications equipment could be significantly improved by networking military radios with other communication platforms. Without universal interoperability, many government agencies would be forced, at great cost, to upgrade or replace otherwise serviceable radio equipment to fulfill mandates for supporting homeland security, emergency communications and more mobile and coordinated armed forces.

Conventional systems currently use separate equipment cabinets providing PBX, radio interface, intercom and VoIP Gateway functionality. That is, separate dedicated communication systems provide platforms for any number of communication sessions between mediums that the individual systems are designed for, but provide little, if any communication interoperability between the platforms. At best, a limited interoperability capability may be provided, but user control of system configuration and user initiated access to communication services is lacking. For example, in the prior art, some PBX systems may include a VoIP interface, but will not interface to radio base stations. Other conventional systems of limited capability are offered to supplement conventional PBX and dispatch systems. Such systems perform radio cross-patching, while others convert radio audio to VoIP, and still others adapt dispatch consoles for connecting to dispatch switching systems via VoIP.

Furthermore, the prior art does not provide for interactive communications capability between platforms. This prevents user programmable configuration and dynamic user control of switching and conferencing capabilities between the multiple platforms employed in prior art. Without interactive and dynamic switching capabilities, communications are limited to point to point, call routing and user access to communication services are pre-configured and non-conditional, and user control of conferencing and security features are absent.

SUMMARY OF THE INVENTION

According to one embodiment of the invention, a radio networking system includes at least a first communication port operable to facilitate communication between the radio networking system and a first communication platform. The system further includes at least a second communication port operable to facilitate communication between the radio networking system and a second communication platform. Additionally, a call control software module is operable to automatically and intelligently switch an incoming call from the first communication platform to the second communication platform which is controlled by a processor operable to execute the call control software module according to the information contained in a system configuration database. The call control software module further manages the configuration of call connections and conferencing services, manages signaling between the communication platforms and supports real time user control of desired communication services. The inclusion of port specific programmable signaling protocols allows closely-coupled integration of the Radio Networking System with all other communication platforms.

Such a radio networking system provides for universal interoperability between existing radio, PSTN/PBX and IP communications equipment, as well as extending capabilities beyond traditional point-to-point radio communications. These capabilities include coordinated group communication, user controlled accessibility, and automated intelligent routing of calls across previously incompatible platforms. Further, benefits of the invention include simplified user operation, increased reliability due to redundancy, and secure access via user authentication.

In another embodiment, the interactive response and signaling capabilities of such a radio networking system allows use of the system with little or no training, as well as user selectable (dynamic) routing and access. For example, voice prompts and call progress tones are provided to the user, guiding them interactively and intuitively through the use of the available communications features. Call scenarios accessible to the user may be varied according to the user ID. Furthermore, a system administrator maintains full configuration for setting up, establishing, coordinating, and allowing call conferencing from any platform in communication with the radio networking system.

In yet another embodiment, a VoIP gateway translates communications signaling and data formats between IP communications platforms and the radio network and PSTN platforms. The VoIP Gateway allows any IP communications terminal, such as a laptop computer, IP telephone or workstation to be integrated with the radio network and PSTN network platforms. For example, in a tactical military environment, the VoIP Gateway allows the replacement of existing non-intuitive "black box" communication terminals with computer terminal equipment requiring little, if any, training to operate. The ability to use computer network terminal equipment for both voice and command/control communications vastly increases the mobility, responsiveness and situational awareness of the individual combatant. The VoIP Gateway further allows the Radio Network System to economically scale in size of supported VoIP networks from a few users to large, multiple site user networks.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is presented to enable a person skilled in the art to make and use the invention. The general principles described herein may be applied to embodiments and applications other than those detailed above without departing from the spirit and scope of the present invention. The present invention is not intended to be limited to the embodiments shown, but is to be accorded the widest scope consistent with the principles and features disclosed or suggested herein.

Figure 2:
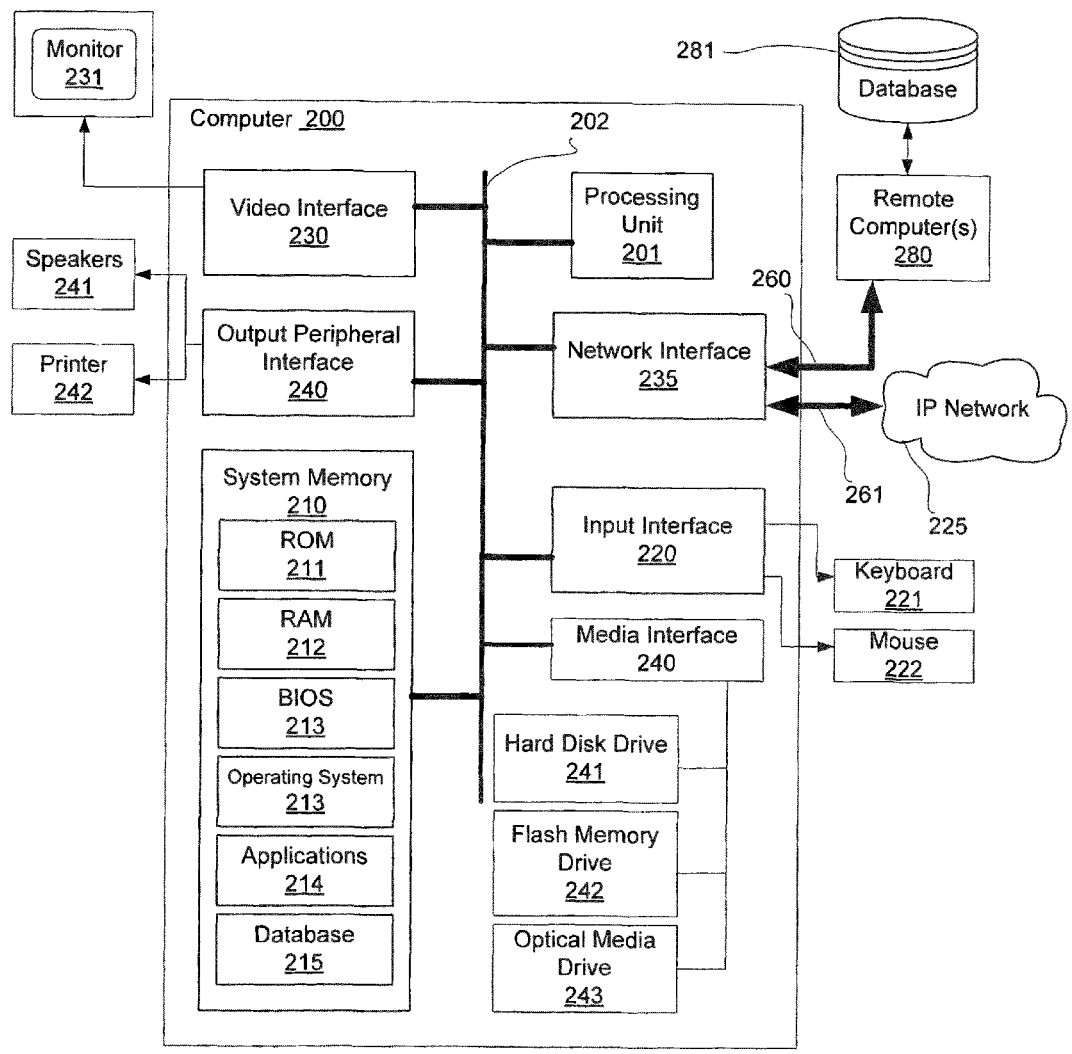
FIG. 2 is a diagram of an exemplary computer environment in which software embodiments of the invention may be practiced according to an embodiment of the invention.

FIG. 2 and the following discussion are intended to provide a brief, general description of a suitable computing environment in which software embodiments of the invention may be implemented. Generally, program modules include routines, programs, objects, components, data structures, etc. that collectively perform particular tasks or implement particular abstract data types. Moreover, those skilled in the art will appreciate that the invention may be practiced with other computer system configurations, including hand-held devices, multiprocessor systems, microprocessor-based, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional computer 200, including a processing unit 201, a system memory 210, and a system bus 202 that couples various system components including the system memory 210 to the processing unit 201. The system bus 202 may be any of several types of bus structures including a memory bus or memory controller, a peripheral bus, and a local bus using any of a variety of bus architectures. The system memory 210 includes read only memory (ROM) 211 and random access memory (RAM) 212. A basic input/output system (BIOS) 213, containing the basic routines that help to transfer information between elements within the computer 200, such as during start-up, is stored in the system memory 210. The system memory 210 may further include program applications 214 and program modules 215.

The computer 200 may further include a hard disk drive 241 for reading from and writing to a hard disk (not shown), a flash memory drive 242 for reading from or writing to a removable flash memory and an optical media drive 243 for reading from or writing to a removable optical disk (not shown) such as a CD ROM or other optical media. The hard disk drive 241, flash memory drive 242, and optical media drive 243 are connected to the system bus 202 by one or more media interfaces 240 (only one shown). The drives and their associated computer-readable media provide both volatile and nonvolatile storage of computer readable instructions, data structures, program modules and other data for the computer 200.

Although the exemplary environment described herein employs a hard disk, a removable flash memory and a removable optical disk, it should be appreciated by those skilled in the art that other types of computer-readable media which can store data that is accessible by a computer, such as magnetic cassettes, removable memory disks, digital versatile disks, Bernoulli cartridges, random access memories (RAMs), read only memories (ROM), and the like, may also be used in the exemplary operating environment.

A number of program modules may be stored on the hard disk, flash memory, optical disk, ROM 211 or RAM 212, including an operating system, one or more application programs, other program modules, and program data, all of which are not shown). A user may enter commands and information into the computer 200 through input devices such as a keyboard 221 and pointing device 222. Other input devices (not shown) may include a microphone, scanner, or the like. These and other input devices are often connected to the processing unit 201 through an input interface 220 that is coupled to the system bus 202. The input interface 220 may be a serial port, a parallel port, Ethernet ports, a universal serial bus (USB) or any other interface. A monitor 231 or other type of display device is also connected to the system bus 202 via an interface, such as a video interface 230. One or more speakers 241 are also connected to the system bus 202 via an interface 240, In addition to the monitor and speakers, a computer 200 typically includes other peripheral output devices, such as printer 242.

The computer 200 may operate in a networked environment using logical connections to one or more remote computers, such as remote computer 280. The remote computer 280 may be another personal computer, a server, a router, a network PC, a peer device or other common network node, and typically includes many or all of the elements described above relative to the computer 200, although only a memory storage device, such as a database 281 has been illustrated in FIG. 2. The logical connections depicted in FIG. 2 include a local area network (LAN) 260 and a wide area network (WAN) 261. Such networking environments are commonplace in offices, enterprise-wide computer networks, intranets and the Internet. As depicted in FIG. 2, the remote computer 280 communicates with the computer 200 via the local area network 260 via a network interface 235. The computer may also communicate with the remote computer 280 through the wide area network 261 which is via the network interface 235 or other remote communications device.

When used in a LAN networking environment or WAN networking environment, the computer 200 is connected to the local network 261 through a network interface or adapter 235. In a networked environment, program modules depicted relative to the computer 200, or portions thereof, may be stored in the remote memory storage device 281. It will be appreciated that the network connections shown are exemplary and other means of establishing a communications link between the computers may be used.

Furthermore, although the computer 200 has been described in terms of a standalone computing environment that may be part of a networked collection of computers, the computer 200 may also be a part of a standard rack-mount computer system (not shown) operable to be mounted in a typical 19-inch rack system (also not shown). Such rackmount systems are typically used in computing systems requiring an extensive level of communication path routing and reliability. Such a system is well-suited for communications applications because a backplane coupling for each insertable computer card may be utilized to add additional computer cards to an existing system's addressing scheme with little or no interruption to the existing operation of the system. The present invention may operate with or without a host CPU in an industry standard chassis, such as a 2.16 PSB, standard 2.1 cPCI or standard VME chassis. As rack-mount computer systems are well known in the industry, this aspect of the present invention will not be discussed in further detail herein.

Figure 3:
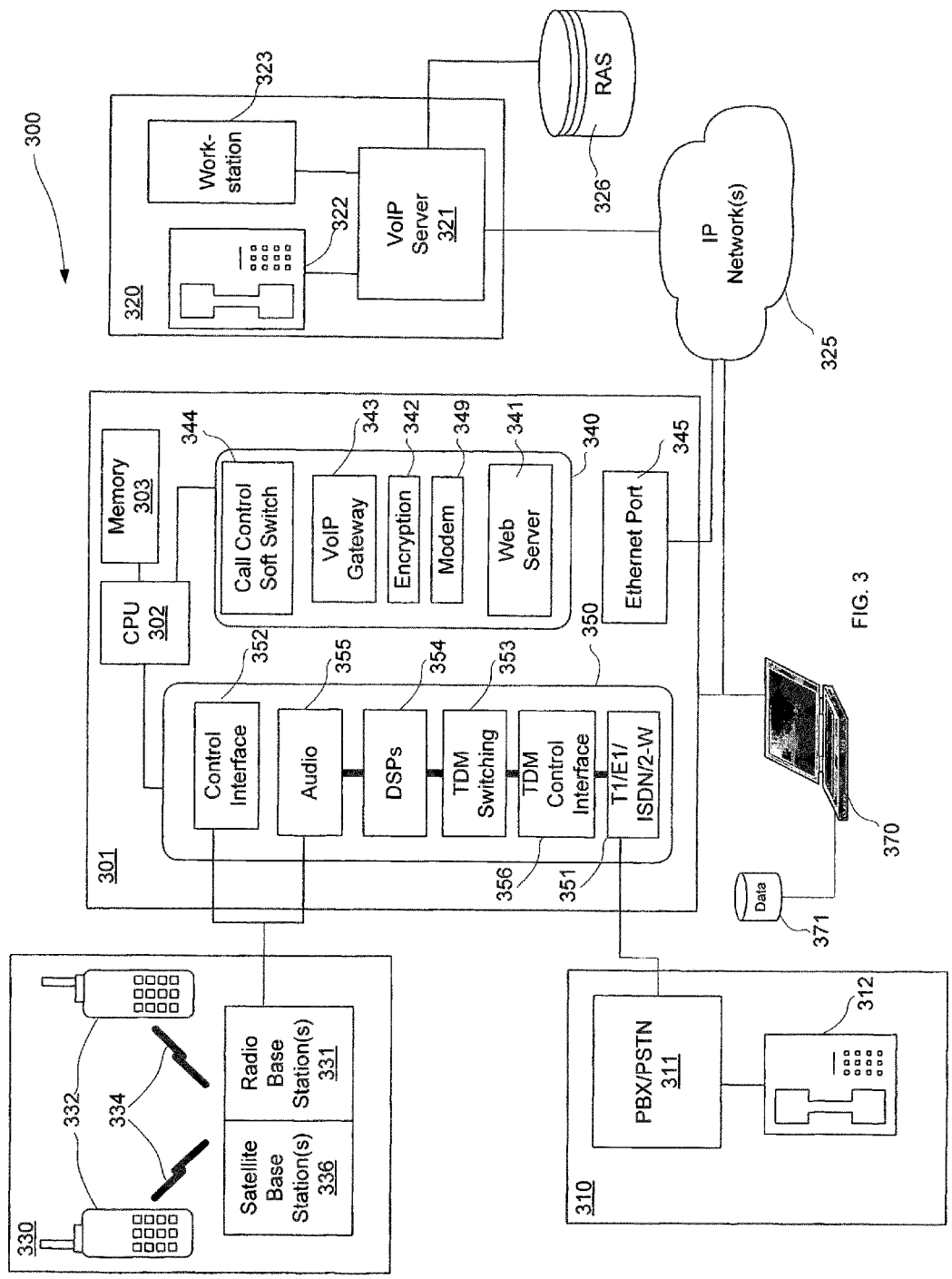
FIG. 3 shows an overview diagram of a communications system operable to provide communications in a multi-platform environment according to an embodiment of the invention.

FIG. 3 shows an overview diagram of a communications system 300 operable to provide communications in a multi-platform environment according to an embodiment of the invention. The communications system 300 includes a radio networking system 301 that includes a plurality of communications ports for interfacing any number of different proprietary or public communication systems, such as a radio communication system 330, a standard telephone network or PBX system 310 and a network-based VoIP telephone system 320. The various proprietary and public systems often have different protocols and standards for communications sessions. Thus, the communications system 300 provides a hub through which various communication sessions may take place despite the differing protocols and standards. These communications sessions and the usefulness of the communications system 300 are discussed in greater detail below.

Generally speaking, the radio networking system 301 of the present invention provides for advanced radio interoperability between a many different communication systems. Specifically, advanced radio interoperability includes the ability of any commercial, public-safety, or military radio user to initiate and receive calls at any time without the assistance of an operator. Radio interoperability allows calls to be made to any other radio, packet-switched IP network, or circuit-switched telephone network connected user, or conference calls established between any combination thereof. Further, each of these potential connectivity, conferencing, and routing options is scalable, assignable, and configurable.

As was discussed above in the background section, a typical switched telephone network 310 may include a public switched telephone network 311 (PSTN or PBX) that provides a platform for a large number of telephones and cellular phones to communicate with each other. As such, a standard telephone 312 may communicate with other standard telephones (not shown) or cellular phones (also not shown). Alternatively, the PSTN 115 may instead be a private branch exchange (PBX).

Further, a typical VoIP system 320 includes at least one VoIP server 321 that may communicate via a network 325, such as the Internet, for example, using a communication protocol, such as TCP/IP, for example. The VoIP server 321 may, in turn, communicate with a respective VoIP-enabled telephones 322 or workstations 323. As such, a communication session may be constructed to allow the first VoIP telephone 322 to communicate with a second VoIP telephone (not shown) entirely over the network 325 without utilizing a PSTN, such as the PSTN 311.

A third system shown in FIG. 3 is a two-way radio system 330. The two-way radio system 330 may include one or more radio base stations 331 or other base stations, such as satellite base station 336, that provide radio-wave transmitting and receiving functions for any number of radios, radio base stations, communications satellite ground stations, microwave stations, etc. within radio-wave range of the base station, such as one or more handheld radios 332. As such, the two-way radio system 330 provides a platform for communicating between radios 332 using transmitted and received radio signals 334. Thus, when a communication session is initiated at handheld radio 332 (i.e., a transmit button is depressed on a conventional push-to-talk radio), the radio base station 331 recognizes the initiation and transmits or receives signals from the initiating handheld radio 332.

According to one embodiment of the invention, each of the above-described systems is communicatively coupled to the radio networking system 301 through a respective dedicated communication port. As is shown in FIG. 3, the PSTN system 310 is coupled to a digital network connection port, such as a T1 port 351. Alternatively, the T1 port 351 may be an E1 port, an Integrated Service Digital Network (ISDN) port, or any other communication port capable of communicating in a digital networking environment. In other embodiments of the invention, the PSTN system 310 may be coupled to the radio networking system 301 via a standard 2-wire telephone connection.

Similarly, the VoIP system 320 is also coupled to the packet switched network 325 via an Ethernet port(s) 345. The network 325 may be the Internet or a private intranet. Further, any connection between the radio networking system 301 and other packet-switched networks may be redundant such that any failure in one connection will not result in a complete loss of signal. Further yet, the network 325 may be a redundant network such that duplicate connections between the radio network system 301 and other communication components ensure a greater capacity for not interrupting communication sessions due to system failure.

Like the PSTN/PBX system 310 and the VoIP system 320, the two-way radio system 330 is also communicatively coupled to the radio networking system 301. More specifically, the radio base station 331 may be coupled to the radio networking system 301 via two particular connection interfaces. First, a radio control interface 352 interacts with the radio base station 331 to allow user control of the base station configuration. For example, a workstation user may dynamically control the operating frequency of a radio base station. The radio control interface may further control signaling between the two systems. That is, communications sessions are initiated, then progress and terminate, such that each respective system may assert control or be controlled depending on the state of the session. As a result, a standard control protocol is communicated back and forth between the radio base station 331 and the radio control interface 352 of the radio networking system 301.

Similarly, a radio audio interface 355 interacts with the radio base station 331 to exchange the actual audio signals between the two systems. The audio signals may be in any recognizable radio format including digital and analog. In one embodiment of the invention, both a digital and an analog radio audio interface 355 are included in the radio networking system 301.

Figure 1:
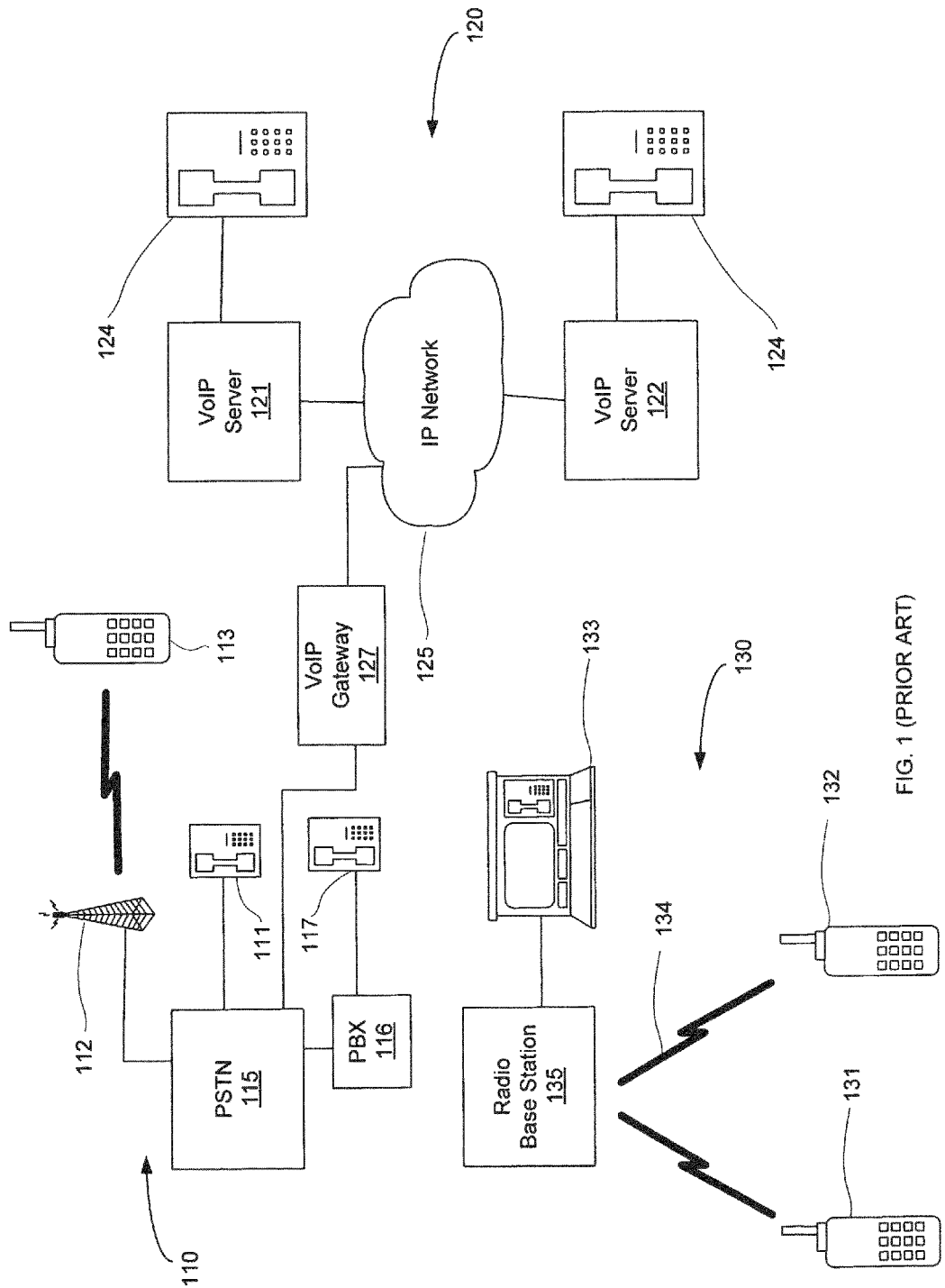
FIG. 1 shows various conventional communication systems and platforms that are independent of each other such that communication sessions cannot be initiated across the various platforms.

As discussed above, each of these systems may be communicatively coupled to the radio networking system 301 of FIG. 1. The radio networking system 301 typically comprises a rack-mountable computer chassis capable of backplane communication routing for one or more interchangeable communication cards. The radio networking system 301, thus, includes at least a radio networking board 350 and typically includes one or more gateway board(s) 340 to further facilitate additional functionality. The radio networking system 301 also includes a central processing unit 302 (CPU)

that is operable to control the various components of the radio networking board 350 and the gateway board 340. Although the CPU 302 is shown in FIG. 3 as a separate component subsystem from the radio networking board 350 and the gateway board 340, the CPU 302 typically resides on the radio networking board 350. Alternatively, the CPU 302 may reside on the gateway board 340 and in other embodiments of the invention not shown, the radio networking system 301 may include a CPU 302 on both the radio networking board 350 and the gateway board 340 that work in conjunction with each other to control the various communication aspects of the radio networking system 301.

Still further, the gateway board CPU 302 may be part of a computer system (not shown) that resides as a separate card in the system chassis or is remotely located and controls the radio networking system 301. For example, a CPU 302 that is part of an adjacent computer card that is part of a package of radio networking systems 301 that work in conjunction with each other may control a plurality of computer cards including the radio networking system 301 of FIG. 3. As will be discussed further below, the CPU 302 may be programmed in any number of ways to carry out the routing and manipulation of communication sessions within the radio networking system 301 and the various programming functions may be stored in a coupled memory 303.

In the embodiment shown in FIG. 3, the radio networking board 350 includes five component subassemblies as shown. As discussed above, the radio networking board 350 includes a plurality of radio control interfaces 352 and radio audio interfaces 355 for facilitating communication sessions between the radio networking system 301 and separate two-way radio systems 330. Likewise, the radio networking board 350 also includes one or more T1/E1 ports 351 for interfacing with communication systems that may connect to a telephone network, such as the PSTN system 310 and includes Ethernet ports that may be connected to the VoIP system 320 and may be connected to administrative terminal(s) 370. The radio networking board 350 further includes a plurality of digital signal processors 354 and a switching component 353, that is associated with a TDM Control Interface 351, that facilitate the manipulation and routing of signals to and from all connected PSTN/PBX communication systems. The functionality and methods of operation of the components of the radio networking board 350 are discussed further below with respect to FIG. 4.

The gateway board 340 includes a plurality of components that also help facilitate the manipulation and routing of communication signals during communication sessions. As shown in FIG. 3, these components include a call control software component 344 that contains subroutines and processes for a number of commonly used communication functions. For example, the call control component 344 may provide the capability for a call state machine that facilitates call control, call conferencing, voice prompts and the like. The software functionality of the call control state machine of the call control software component 344 is described in greater detail below with respect to FIG. 4. Furthermore, the call control software component 344, although shown as part of the gateway board 340, may also be located on the radio networking board 350 in other embodiments.

The gateway board 340 may further include an encryption component 342 that is able to encrypt and decrypt all incoming and outgoing signals to and from the radio networking system 301. Furthermore, the encryption component 342, although shown as part of the gateway board 340, may also be located on the radio networking board 350 in other embodiments. Typical encryption components and systems are well known in the art and are not discussed in greater detail herein.

The gateway board 340 may further include modem 349 that is able to facilitate communication of incoming and outgoing signals to and from other modems in other systems. The modem 349 is used for interfacing with some types of digital phones/radios and also for interfacing with some types of encrypted military voice terminals. Typical modems 349 and systems are well known in the art and are not discussed in greater detail herein.

The gateway board 340 may further include an VoIP gateway component 343 for facilitating an interface between VoIP calls and other non-packet switched protocols such as standard telephone system TDM calls. This component 343 may include industry standard VoIP communication protocols, such as H.323 or Session Initiation Protocol (SIP) providing a means for setting up calls, multimedia conferencing, instant messaging, and other types of real-time communications using a packet-switched network, such as the Internet.

The gateway board 340 may further include a web server component 341 for facilitating system configuration and communication in a VoIP environment. Likewise, the gateway board CPU 302 may further include a VoIP server database, eliminating the necessity for external server 321.

Other communication ports (not shown) that may reside on the radio networking board 350 include one or more foreign exchange station (FXS), foreign exchange office (FXO), other radio and audio interfaces for devices such as headsets, recorders, etc., a backplane bus interface for communication with other cards in the chassis, a User Datagram Protocol/Internet Protocol (UDP/IP) interface for streaming voice data to IP networked servers, PC clients, call managers, an interface for radio transmit activation via PTT, an interface for voice-operated PTT or packet detection methods of controlling PTT and an ISDN communications protocol interface.

Prior to operation, a system administrator may configure the radio networking system 301 via a configuration computer 370 and a system configuration database 371. The configuration computer 370 may use a configuration utility program that connects directly to a configuration port (not shown) of the radio networking system 301. Alternatively, the configuration computer 370 may connect via a web browser over the network 325. The configuration database 371 may store definitions for the attributes of each communication port, such as type of terminal (i.e., a two-way radio system 330) and terminal specific configuration and communications protocol parameters (i.e., the two-way radio system 330 is a trunked P25 radio system).

The programmable communication port configuration and signaling protocols allows the Radio Networking System to interoperate with virtually any legacy or newly developed radio, PSTN/PBX or VoIP terminal device. Other configuration parameters include call progress scenarios based on the radio networking system 301 comparison of its own database (i.e., memory 303 or memory in the server component 343) to caller input events, dial numbering plan, IP port addresses, pre-defined conference access and conference configurations, tandem dial access codes, workstation user data entry, etc. The system administrator may also configure a user information database (which is part of the server component 343) with user access codes, priority information, personalized user routing scenarios, security information, etc.

Turning back to the radio networking board 350, the DSPs 354 together with the switching component 353 support audio signaling, call state control, caller ID, conferencing, PBX, vocoders and VoIP functionality. The multi-port switching capabilities of the radio networking system 301 selectively provide voice communication channels between radio ports, DSP resources, telephone ports, audio ports and IP ports. These capabilities are fully programmable by a system administrator and can be configured to handle various call initiations and switching automatically and with or without operator intervention.

For example, the radio port (i.e., radio control interface 354 and radio audio interface 355) may control a radio base station 331 transmit/receive switching for supporting half duplex radio connections via push to talk and voice activation techniques. As such, when a signal originates from a handheld radio 332, the signal is received at the radio base station 331 and may be broadcast to other handheld radios (not shown). The radio port may also send and receive radio circuit control tones, such as CTCSS. Additionally, the signal is passed to the radio audio port 355 and may be routed to a predetermined path as configured by a system administrator and as controlled by the handheld radio user. Thus, the signal may be switched to a path to the telephone 312 through the PSTN system 310 and the T1 port 351. Likewise, the signal may also be routed to the VoIP telephone 322 via the VoIP system 320, the network 325, and the Ethernet port 351.

In essence, once the signal is received at the radio audio port 355, the format of the signal (4-wire radio audio, for example) is abstracted into a format that is easily digitized and switchable (TDM for example). That is, the radio networking system 301 is able to manipulate all received signals to a common format such that all signals may be switched, conferenced and re-routed with relative speed and ease to any other communication port in the radio networking system 301.

As another example, the radio networking system 301 may receive a signal from a handheld radio 334 as described above and re-route the signal to a second radio audio interface (not shown) that is coupled to a second radio base station (also not shown) that is operating at a different frequency than the first. The signal may then be routed to the second radio base station and subsequently broadcast to all radios operating at the second frequency. As a result, radios operating at different frequencies may communicate directly through the radio networking system.

Having a radio networking system 301 able to provide a platform for multiple two-way radio communication is beneficial for equipment not specifically dedicated for multi-platform use. This is often the case when a fire department and a police department need to operate at different frequencies during normal operating times. However, in an emergency, it is beneficial to allow a police department and a fire department to communicate with each other using their existing equipment and without requiring officers in the field to do extensive manipulation and equipment setting. Thus, the radio networking system 301 provides a liaison between the two radio networks where signal switching and communication services are automatic, dynamic, user configurable to match the user environment and user-accessible in real time.

As yet another example, the radio networking system 301 may also be configured to establish any number of conference call situations. Through configured switching settings and programmable DSP's, users of handheld radios 334, telephones 312, VoIP workstations 323 and VoIP telephones 322 may all be concurrently connected to a communication session with all others. Thus, in one example, a radio user may talk to a telephone user while a VoIP user can hear both. Conference calling may be configured as an automatic setting by a system administrator or may be set up as an optional path that may be followed by a user of a communication device who enters a specific key code. (i.e., pushing "*88" on a telephone) to enter a predetermined conference call session.

The radio networking system 301 offers advantages in flexibility, performance, cost, user friendly interface and space savings over alternate multi-assembly solutions. The radio networking system 301 features include DSP audio processing, I/O channel switching, I/O port signaling protocols, channel mixing, Time Division Multiplex (TDM) switching backplane interface and intercom/conferencing communications. In other features, the radio networking system 301 includes a flexible universal interface to all types of radios and headsets. An operator may control the radio base station transmitter via a push-to-talk keyed microphone or voice-operated exchange and via a workstation keyboard, footswitch, touch screen or mouse controls. Each channel or conference audio may be recorded and played back with compression and time stamping. On-board VoIP capabilities may integrate supported analog audio devices with packet-switched networks via dual 100baseT ports, providing redundancy and eliminating single points of failure.

The conferencing, intercom, and multiple radio monitoring capabilities may be accessed directly by the individual user, speeding communications and multiplying their effectiveness. Monitoring capability assists communications controllers and workstation users in simultaneously monitoring multiple radio communications channels and communicating over an open intercom link. For example, a typical radio user need only be aware of particular pre-configured command codes to navigate in and out of conferences. Further, with the correct pre-configuration, a typical user could even establish new conferences and set specific conference parameters in real time given the right permissions.

Further, a system administrator has powerful configuration capabilities such that any number of conference call parameters may be established ahead of time, i.e., prior to an emergency, for example. Such parameters include what users may join a conference, how to join a conference, what signals will pass to each user, a permission level for each user that may allow or deny joining, configuring, passing signals, etc. In essence, a system administrator may set any rule regarding call conferencing up to and including ceding almost all administrative functions to other users at other workstations.

When a conference call is established, a call supervisor may be established. The conference call supervisor may control access to the conference call, control permissions for joining and talking on a conference call, control terminating the conference call, control changing parameters of the conference call in real time, and may even transfer supervisory control to other users. Typically, the supervisor parameters are established ahead of time by a system administrator, but may also be done in real-time as a situation may dictate.

Workstation operator efficiency is increased through distinctive left-right channel headset audio separation, foreground/background mixing of all I/O channels, individual gain control on each channel and simultaneous monitoring of multiple channels. The board delivers distinctive right-left channel headset audio feeds, improving operator capabilities in urban or rural emergency or combat situations. Allowing intercom audio to be heard in one earpiece, while a mix of multi-channel radio traffic is heard in the other earpiece, results in reduced operator workload. Alarm or weapon tones can be heard in both earpieces simultaneously.

Another interactive capability of one embodiment of the invention allows ANI (Automatic calling Number Identification) when provided by the external communication platform as well as caller identification, verification and authorization against the RAS (Registration and Authentication Server)

database to provide secure network communications. In addition, an RAS database 326 may be used to store user preferences, personalized user workstation settings and personalized web server based workstation screen scripting simplifying use of the radio networking system 301. RAS information identifying variable class of service features facilitates connectivity in priority situations. For example, a police chief or military General may commandeer a communications link for priority communications over a lesser ranking officer. In another example, a workstation user may log on using their ID and PIN codes to any available workstation on a VoIP network and have its screen boot with all of their desired work group, conference, PSTN/PBX, VoIP and radio configuration settings.

Other features of communication session manipulation and routing are contemplated in the radio networking system 301, such as call forwarding, caller identification, call logging, and the like, but are not discussed in greater detail herein as these features are known in the industry.

Figure 4:
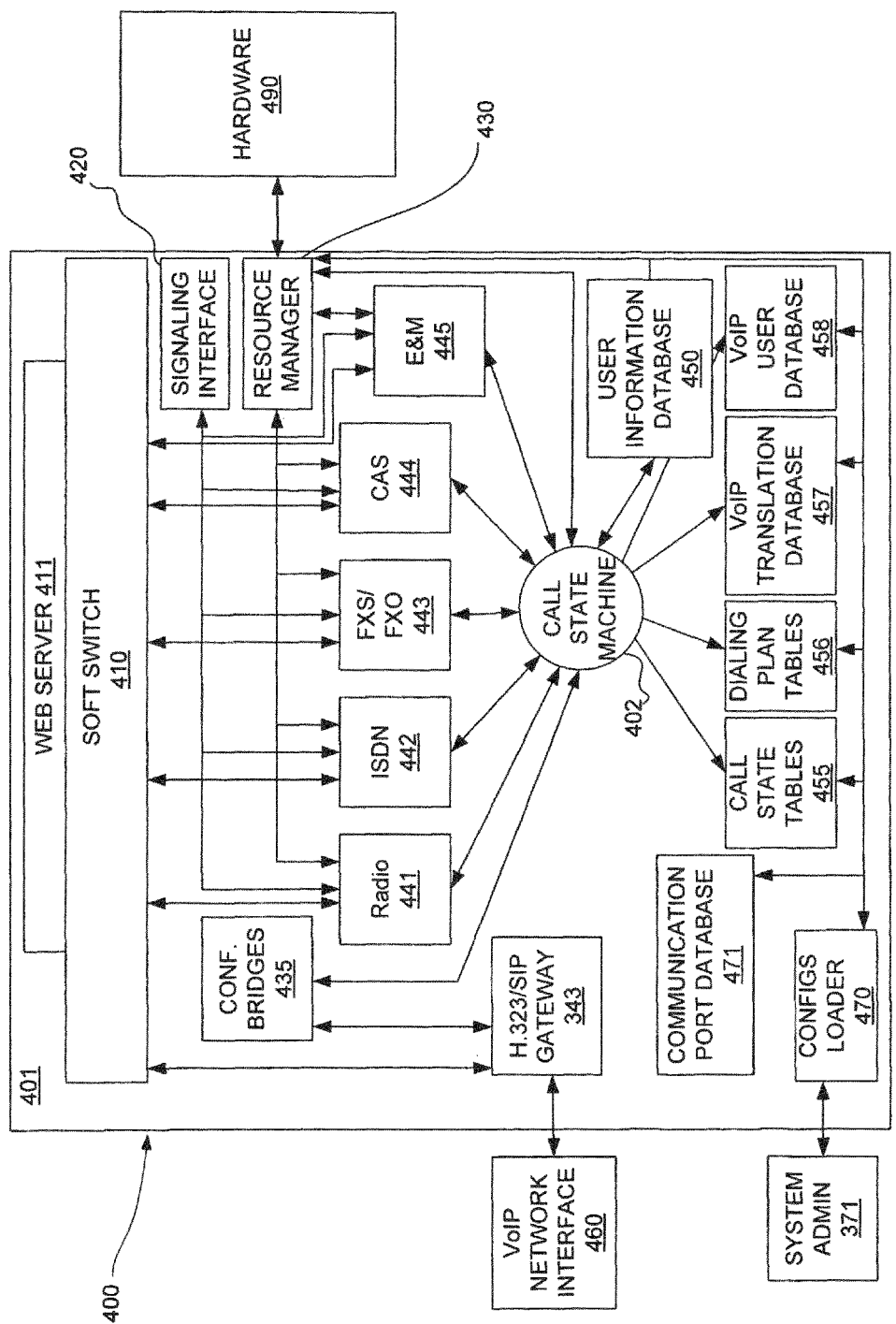
FIG. 4 shows a block diagram of the software architecture of a call control system according to an embodiment of the invention.

FIG. 4 shows a block diagram of the software architecture of a call control system 400 according to an embodiment of the invention. As shown, the architecture includes a call control software module 401 for real-time communications applications, communications soft-switch and gateway functionality, call processing, conferencing and for control of signaling and switching resources. The call control software module 401 includes several sub-modules including a highly configurable call state machine 402 which is customizable for manipulating and handling calls and conferences to meet the requirements of any application environment.

The CPU 302 (not shown in FIG. 4) executes various call processing programs under the control of a softswitch application layer 410. The various call processing programs provide user-controlled automated routing and interactive access to conference networks, other radio and telephone users, and operator consoles via associated hardware 490 which is a representation of some of the aspects the radio networking system 301 of FIG. 3. Additionally, the various call processing programs also provide user-controlled automated communications with a VoIP network via the H.323 or SIP gateway 343. The various call processing programs are based on a call state machine 402 architecture which is configurable by a system administrator via a configuration computer 371.

The call state machine 402 controls a signaling and protocol interface 420 for handling universal connections with a wide variety of terminal devices connected to the radio networking system communication ports. As such, any number of signal formats may be translated through various format interfaces. These interfaces include a radio base station interface 441, an ISDN interface 442, a Foreign Exchange Station (FXS) and Foreign Exchange Office (FXO) interface 443, a Channel Associated Signaling (CAS) interface 444, E-lead/M-lead signaling (E & M) interface 445 and VoIP Gateway 343. Through these interfaces, the various communication formats may be translated, conferenced, and routed according to desired communication needs.

Between the signaling interface and a resource manager 430, all communication signals may be manipulated and routed according to defined parameters of the call state machine 402. Further, the call state machine 402 may utilize a number of routing options and data available. For example, the call state machine 402 may draw upon a number of pre-defined configurations that are stored by a configuration loader 470. Various configurations may include a predefined communication port database 471, call state tables 455, dialing plan tables 456, VoIP translation database 457, VoIP user database 458 and a user information database 450. The complete Radio Networking System configuration databases and tables may be stored in computer memory and subsequently remotely downloaded into the Radio Networking System via configuration loader 470. The down loadable configuration allows rapid setup and re-configuration of the Radio Networking System in response to changing communication environments or emergency situations. Standard "template" (pre-configured operating scenarios) configurations may be provided to simplify initial system installation and start-up. Additionally, the call state machine 402 may direct conferencing sessions via a conferencing bridge 435 and may direct VoIP network communications via a network interface 460. Using the above-described architecture, the call control software module 401 may invoke any number of different processes for call handling, routing, conferencing, and manipulation.

In one embodiment, one particular process begins with a call request event, i.e., a radio carrier detect by a radio base station, an off hook or ISDN message from a PSTN/PBX telecommunication terminal or a push-to-talk signal from a VoIP workstation terminal. The call state machine 402 transitions from an idle state to incoming call processing state. Various optional responses may be defined for this state, such as, play a prompt message, return dial tone, wait for digit input from the caller, etc, resulting in defined responses, such as switching the call, transitioning to another state, prompting for additional input, or making logical decisions based on caller input. The initial call state has the capability to call a resource manager to make the appropriate switch connections between incoming ports and the appropriate DSP resources, cause tone or prompt message play, or detect and decode caller input information. The call state machine 402 will transition to the next state depending upon the caller response and lookup into the dialing/response table.

In another embodiment, a special incoming call state may be configured to verify the incoming caller ID and calling number ID against the user information database 450 to allow or deny system access for security purposes. In yet another embodiment, a special incoming call state may be configured to compare the incoming caller ID and calling number ID against the user information database 450 to present the caller with a unique set of routing scripts and service access codes. Secure military radios are accommodated via a unique radio interface satisfying the security protocol and physical layer interface requirements of encrypted type of military communications terminals. As discussed above, onboard encryption is also available as a security option.

The call state machine 402 may monitor the call status and tear down a call when completion is indicated by disconnecting the switching connections and returning the DSP resources to the available pool. The process is similar for calls originating from the PSTN/PBX telecommunications terminal side of the system. In this case, a standard telecommunication signaling interface, such as ISDN, is supported to achieve full interoperability with PSTN/PBX platforms. The process is similar for calls originating from the VoIP network side of the system. In this case, a standard H.323 or SIP communication protocol is supported to achieve full interoperability with VoIP network devices.

As discussed above, various conferencing modes are also available, including preset and meet-me types. Preset conferencing establishes a set of participants that are notified by the system whenever a preset conference is activated. Meet-me conference is dialed in by each individual participant. The system also allows the configuration of special purpose conferences, such as one way listening as a function of user class of service or supervised conferences where one or more individuals control user access to the conference.

A subset of the conferencing capabilities includes the ability to monitor a mix of audio from multiple radios via a single audio channel. This feature is useful in tactical military applications or emergency response situations. The call state machine 402 may be programmed to provide a full featured PBX, eliminating the necessity for a separate system to provide this functionality. System status information, such as ports active, conferences and participants active may be displayed on operator consoles and VoIP workstations.

Figure 5:
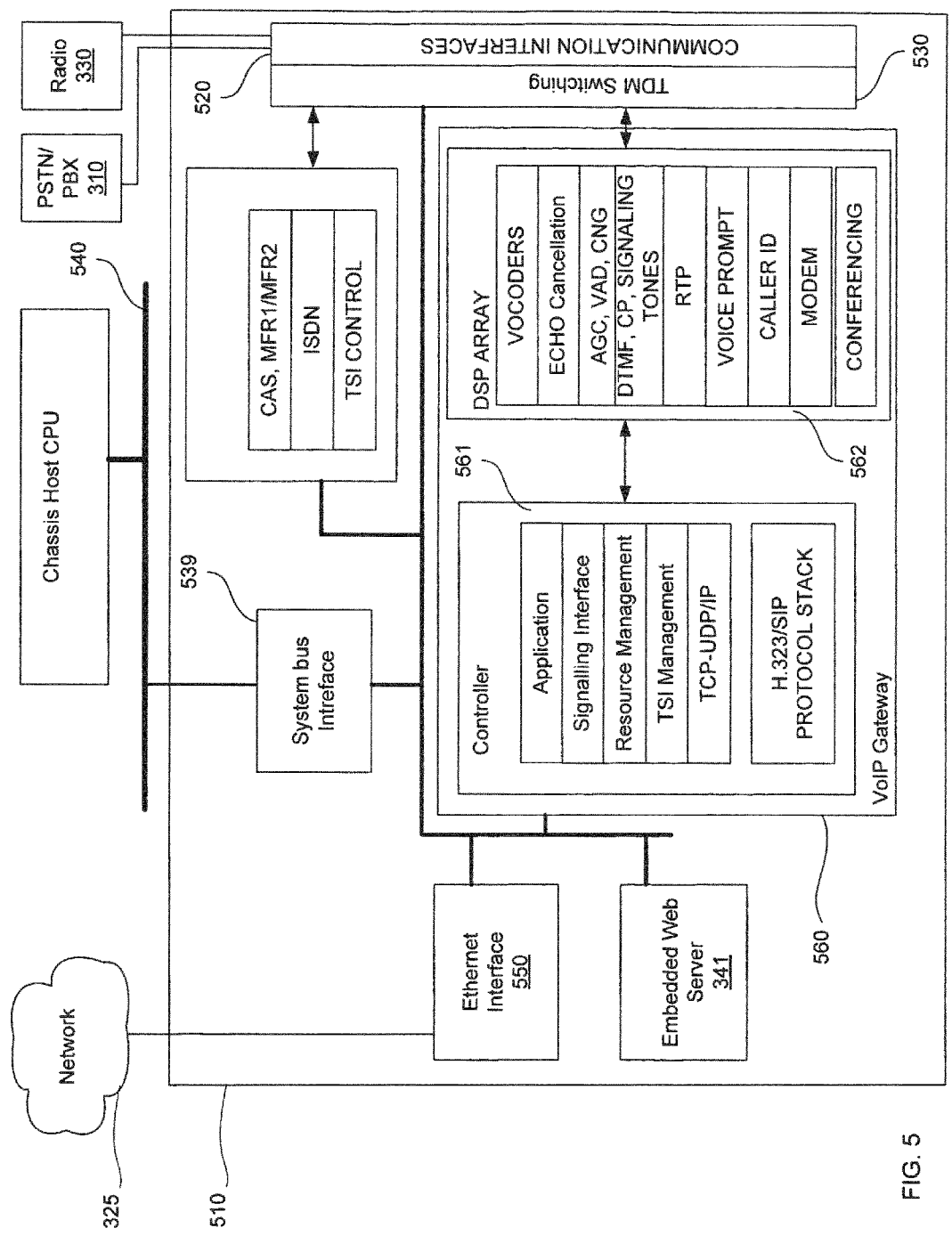
FIG. 5 shows a block diagram of a VoIP Gateway operable to provide an interface from one platform to another platform according to an embodiment of the invention.

FIG. 5 shows a block diagram of a communications server 510 operable to interface one platform to another platform according to an embodiment of the invention. As noted previously, the present invention may be practiced in a networked environment. As such, various functions may be performed across a network at a computer system coupled to a larger distributed computing system (not shown in detail). Thus, a number of different chassis computers having one or more communications server cards 510 operating therein may facilitate communications across several communications platforms.

In FIG. 5, a VoIP Gateway card 510 may be part of a Radio Networking System 301 and may communicate with a chassis host CPU 501 via chassis bus 540. The communications server card 510 may include a bus interface 539 for interfacing the chassis bus 540. Further, the VoIP Gateway card 510 may communicate with a packet-switched network 325 via an Ethernet interface 550. The packet-switched network 325 may, in turn, be connected to a web server component 341 of the radio networking system 301 of FIG. 3 or another communications server card (not shown) in yet another chassis computer system. Further yet, the VoIP Gateway may be coupled to a PSTN system 310 or a radio system 330 via a communication interface 520.

Using the above-identified interfaces, the VoIP Gateway card 510 may extend the multiplatform communication switching, routing, signaling and conferencing functions as described above to VoIP networks with respect to the radio networking system 301. Thus, a single radio networking system 301 may employ extended control over a large network of communications systems through VoIP Gateway card 510 that are able to communicate with the VoIP terminals of each respective communications platform.

Such extensions of capabilities are typically embodied in a VoIP Gateway card 560 that includes a controller 561 and a DSP array 562. Although not detailed in length, the controller may provide capabilities such as signaling interface, resource management, TSI management, TCP-UDP/IP Stack, and a protocol stack. Further, the DSP array may provide capabilities such as vocoders, echo cancellation, AGC, VAD, CNG, signaling tones, RTP, Voice prompts, caller ID, modems and additional conferencing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It is claimed:

1. A communications networking system comprising:
    a push to talk radio interface through which communication with a plurality of push to talk radio devices travel via an external radio base station;
    a network interface through which Voice Over Internet Protocol (VOIP) communications with a plurality of VOIP devices travel and through which data communications with external devices travel;
    a call control unit defining communication session parameters for the push to talk radio interface and the network interface, the call control unit operable to be controlled by a user of one of the VOIP devices such that the call control unit allows VOIP device users to simultaneously monitor communications from at least one network interface and at least one push to talk radio interface and select from at least one network interface and at least one push to talk radio interface to establish communication sessions with one or more other users;
    a programmable signaling processor configured by a VOIP device user to establish communication sessions between the push to talk radio devices and the VOIP devices allowing for multiple push to talk devices and multiple VOIP devices to all communicate concurrently in a conference including enabling at least one of the users of one of the push to talk radio devices and/or at least one of the users of one of the VOIP devices to join the conference or initiate the conference;
    the programmable signaling processor further configured to intelligently control push-to-talk signaling of radio base stations externally connected to the push to talk radio interface and buffer data in memory such that an initial portion of audio or data transmitted during the communications sessions is not truncated;
    wherein the communications networking system is configured to convert audio and signaling communications received over the push to talk radio interface and the network interface into a common format for use within the communications networking system.

2. The communications networking system of claim 1 further configured to receive VOIP communications from multiple sources, convert the VOIP communications to the common format, and conference multiple VOIP device users including providing multiple networked communications terminals and VOIP devices the ability to talk simultaneously.

3. The communications networking system of claim 2 further configured to conference VOIP communications using either unicast or multicast packet address protocols.

4. The communications networking system of claim 1 further comprising a buffer memory configured to compensate for delays resulting from VOIP packetizing, network transport, signaling protocols, voice detection and radio transmitter power up, thereby avoiding loss of the initial portion of a radio transmission.

5. The communications networking system of claim 1 further configured to exchange signaling and status information with externally connected radios to allow a system user to remotely control the configuration of a selected radio, including setting frequency, channel preset, modulation type, guard receive, built in test, squelch and power of the selected radio.

6. The communications networking system of claim 1 configured as a VOIP communications device, the VOIP communications device further comprising:
    at least one audio interface capable of connecting to an audio device included in or coupled with the VOIP communications device, the audio device selected from the group including a headset, a microphone and a speaker, via a wired or wireless connection, the audio interface supporting push to talk control through which users of the audio devices communicate;
    a network interface through which VOIP communications with a plurality of additional VOIP devices and radio gateways travel and through which data communications with external devices travel;

a call control unit defining communication session parameters for the audio interface and the network interface, the call control unit operable to be controlled by a user of one of the audio devices such that the call control unit allows users to simultaneously monitor a mix of communications from multiple networked radio gateways or VOIP devices and select from at least one networked radio gateway or VOIP device to establish communication sessions with one or more other users;

wherein the programmable signaling processor is configured by an audio device user to establish communication sessions between one or more radio gateway systems and VOIP devices allowing for multiple radio gateway systems and multiple VOIP devices to all communicate concurrently in a conference, including enabling the audio device user to join the conference or initiate the conference;

wherein the programmable signaling processor is further configured to generate a mix of audio originating from a multiple of the networked radio gateway systems or VOIP devices as a single audio stream according to a mix selection specified by the audio device user;

wherein the VOIP communications device is configured to convert audio and signaling communications received over the audio device interface and the network interface into a common format for use within the communications network system.

7. The communications networking system of claim 6 further configured to allow the VOIP devices to be controlled through the communications networking system from an external networked communications terminal.

8. The communications networking system of claim 1 further configured to receive and transmit VOIP communications over wireless and wide area networks, including satellite networks, exhibiting lengthy data packet transmission delays and loss of data packets;

use a UDP method of VOIP audio and signaling packets transmission;

provide recurring transmission of control commands to circumvent the effects of data packet loss;

communicate using selectable compressed VOIP audio packet transmission on the uplink and/or downlink path of a wireless network to minimize link bandwidth;

and transmit an abbreviated packet during periods of audio silence to minimize link utilization.

9. The communications networking system of claim 8 located in an unmanned vehicle, the communications networking system further comprising:

at least one radio interface operable to configure radios communicatively coupled to the communications networking system;

wherein the programmable signaling processor is configured to allow a remote site operator to control the communications networking system including configuration, conferencing and patching of radios communicatively coupled thereto and functional testing of the communications networking system and radios.

10. The communications networking system of claim 1 wherein the communications networking system is further configured to convert audio and signaling communications received from multiple radio types into the common format;

wherein the communications networking system presents audio and signaling communications in the common format to network devices independent of radio type such that the communications networking system provides a common interface to the network devices.

11. The communications networking system of claim 10 wherein the programmable signaling processor is configured to maintain a signaling connection with multiple radios that is always on.

12. The communications networking system of claim 1 wherein the programmable signaling processor is configured to translate control messages received in the common format over the network interface into a type specific format required for controlling and configuring the radio or radios communicatively connected to the communications networking system.

13. A method performed by a communications networking system, the method comprising:

the communications networking system establishing a communication session with a plurality of external push to talk radio devices, the communication session initiated by a user of one of the external push to talk radio devices or one of a plurality of external networked communications terminals communicatively coupled with the communications networking system;

the communications networking system automatically creating a communication link between the external push to talk radio devices and at least one of the external networked communications terminals including at least one Voice Over Internet Protocol (VOIP) device;

the communications networking system converting communications from the external push to talk radio devices, external networked communications terminals and VOIP devices into a common format, wherein the common format conforms to a VOIP protocol;

the communications networking system receiving communications from the external networked communications terminals and VOIP devices to control the configuration of the communications networking system;

the communications networking system establishing a conference call among multiple push to talk radio devices, external networked communications terminals and VOIP devices in which the push to talk radio devices, external networked communications terminals and VOIP devices communicate concurrently in the conference call.

14. The method of claim 13 further comprising:

the communications networking system providing call control features to the networked communications terminals and the VOIP devices such that users of the networked communications terminals and the VOIP devices have the ability to control a plurality of call control parameters associated with the conference call and the communication link during the communication session.

15. The method of claim 13 further comprising:

the communications networking system providing audio and data buffering features to the networked communications system such that the initial portion of a radio transmission is not lost due to delays resulting from VOIP packetizing, network, signaling, voice detection and radio transmitter power up.

16. The method of claim 13 wherein the communications networking system combines multiple IP audio streams originating from multiple gateway locations and/or multiple connected VOIP devices into the conference call and provides the ability for multiple multicast networked communications terminals and VOIP device users to talk simultaneously in the conference call.

17. The method of claim 13 further comprising:
a programmable signaling processor of the communications networking system translating control messages conforming to different messaging data formats of multiple types of radios communicatively coupled with the communications networking system into a common format.

18. The method of claim 17 further comprising:
the programmable signaling processor receiving radio specific messaging format data to enable the translating into the common format.

19. The method of claim 17 further comprising:
the programmable signaling processor allowing a networked communication device to remotely control multiple radios using a common interface according to the common format.

\* \* \* \* \*